Figure 1:
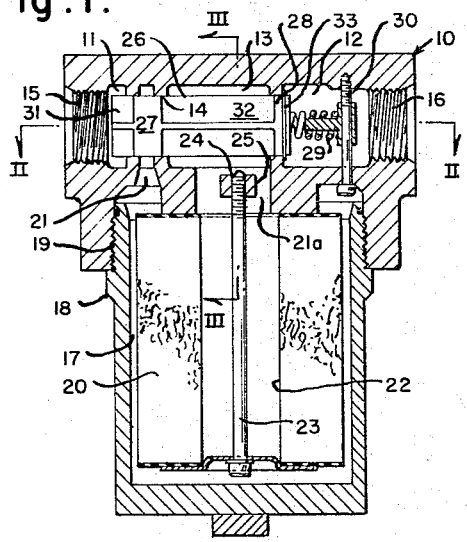

Nov. 1, 1966    E. K. BAIR ETAL    3,283,098
HIGH PRESSURE FILTER HAVING A RELIEF VALVE IN THE BASE
Filed June 15, 1964

INVENTORS
Edwin K. Bair &
Robert F. Hodgson

3,283,098
HIGH PRESSURE FILTER HAVING A RELIEF VALVE IN THE BASE

Edwin K. Bair, Roseville, Calif., and Robert F. Hodgson, Canfield, Ohio, assignors to Commercial Shearing & Stamping Company, a corporation of Ohio
Filed June 15, 1964, Ser. No. 375,017
5 Claims. (Cl. 210—133)

This invention relates to high pressure filters and particularly to filters for use in high pressure hydraulic oil systems such as are used on earth-moving equipment and the like. The use of filters on hydraulic fluid systems for earth-moving equipment and the like is not itself new. It is very desirable that the hydraulic fluid used in such systems be continuously filtered to prevent dirt from reaching any of the highly polished surfaces of the hydraulically operated equipment of machines of the type here mentioned. It is also desirable that the filter means, such as a filter cartridge, be removable for cleaning or exchange without the need for special valving in the system and with the minimum loss of oil. It is also desirable that some safety device be provided whereby high pressure oil in excess of the capacity of the filter may be bypassed in emergencies to prevent damage to the filter. Prior to the present invention, there was no satisfactory single filter device which could accomplish all of these purposes and in order to attain all of these purposes, it was necessary to provide additional hydraulic piping in the system. The present invention for the first time provides a unitary filter structure which accomplishes all of the foregoing purposes without need for extraneous piping.

In a preferred embodiment of our invention, we provide a high pressure filter having a base with spaced inlet and outlet chambers and an intermediate diversion chamber therebetween, an inlet port communicating with the inlet chamber, an outlet port communicating with the outlet chamber, a passage extending through said inlet, outlet and diversion chambers, a filter chamber on the base, filter means in said filter chamber, a first filter port means communicating from one side of the filter means to the passage at a point adjacent the inlet chamber, a second filter port means communicating from the other side of the means to the diversion chamber, a sliding spool in the passage movable lengthwise thereof, means on the spool acting in one position to close all of the chambers in the base, in a second position to open the inlet chamber to the first filter port and simultaneously the diversion chamber to the outlet chamber and in a third position opening all chambers through the passage to provide communication directly from the inlet port to the outlet port through said chambers bypassing the filter chamber and resilient means in the base continuously urging the spool means to the first position, said resilient means being adjusted to permit the spool to move successively from the first to the third position at pre-selected fluid input pressures. Preferably, the resilient means is a spring acting on one end of the spool urging it towards the inlet chamber.

Figure 2:
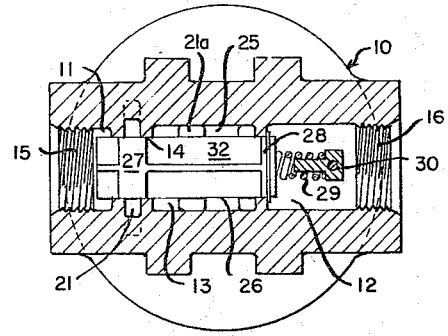
Figure 3:
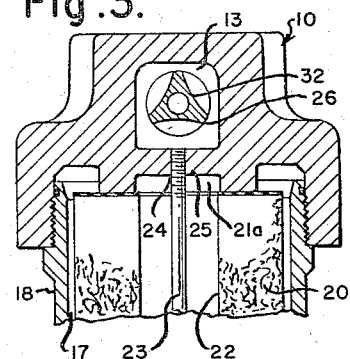
Figure 4:
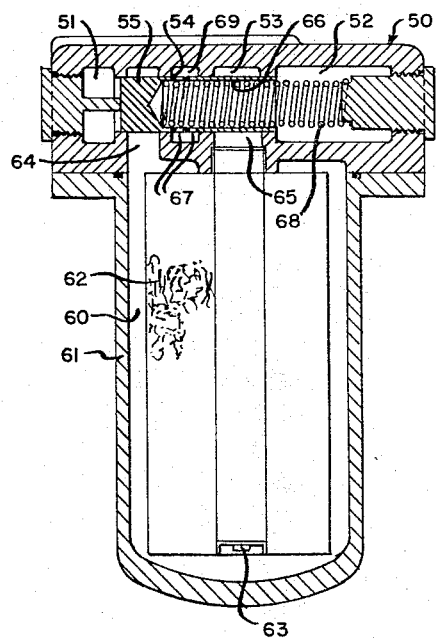

In the foregoing general description, we have set out certain objects, advantages and purposes of the present invention. Other objects, advantages and purposes will be apparent from the following description and the accompanying drawings in which:

FIGURE 1 is a vertical section through a filter according to our invention;
FIGURE 2 is a section on the line II—II of FIGURE 1;
FIGURE 3 is a partial section on the line III—III of FIGURE 1;
FIGURE 4 is a vertical section through a second embodiment of our invention; and
FIGURE 5 is a top plan view of the filter of FIGURE 4.

Referring to the drawings, we have illustrated a filter base 10 having an inlet chamber 11, an outlet chamber 12, and an intermediate diversion chamber 13, a passage 14 communicates between the several chambers, an inlet port 15 communicates with the inlet chamber 11 and an outlet port 16 communicates with the outlet chamber 12. A filter chamber 17 is provided on the base by means of a threaded cap 18 threaded into an opening 19 in the base. A filter element 20 is provided within the filter chamber 17. A filter inlet port 21 communicates with the exterior of the filter element 20. A filter outlet port 21a communicates with the hollow interior 22 of the filter means 20. The filter means is held in position in the filter chamber by a fastening bolt 23 which threads into a threaded opening 24 in a cross member 25 of the base. A sliding spool 26 is movable in the passage 14. The spool is provided with spaced lands 27 and 28 which act to seal all of the chambers and the inlet filter port from one another in a first position to which the spool is urged by spring 29. Spring 29 is held in position on a pin 30 in the outlet chamber. The spool 26 is provided on opposite sides of land 27 with flats 31 and 32 which reduce the diameter of the spool in those areas. A stop ring 33 is provided on the spool to prevent the spring 29 from forcing the spool beyond a pre-set first position in which the lands on the spool close all of the chambers from one another.

The operation of the filter means of this invention is as follows. High pressure fluid is introduced into the inlet port 15 and the inlet chamber 11 from a source of high pressure fluid. The fluid acting on the spool end forces the spool to move to the right against the pressure of spring 29. The pressure of the spring 29 is set so that under normal operating conditions the normal fluid flow will urge the spool to a second position in which the land 27 moves to the right and permits flow from inlet chamber 11 to filter inlet 21. The fluid passes through the inlet 21, through the filter means 20 into the hollow central portion of the filter 20, through the filter port 21a into the diversion chamber 13, across the flats 32 into outlet chamber 12 and out of outlet port 16 to the fluid system to be actuated. When the pressure drops spring 29 forces the spool to the left closing all of the ports. In this condition, the cap 18 may be removed for replacement of the filter element without any significant loss of fluid from the system. In the event that the incoming oil pressure exceeds a pre-selected pressure, the spool 26 is moved to the right so that the land 27 moves within the diversion chamber 13 and the fluid passes directly from inlet chamber 11 through port 21 into diversion chamber 13, from there into outlet chamber 12 and through the outlet port 16 in a straight line without passing through the filter in this third position of the spool which acts as a high pressure relief valve protecting the filter means from damage.

Figure 5:
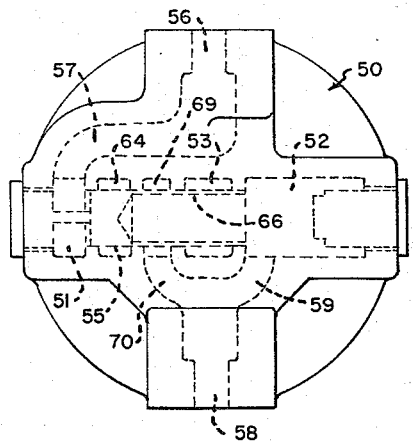

In the embodiment illustrated in FIGURES 4 and 5, we have shown a base 50 having an inlet chamber 51, an outlet chamber 52, and an intermediate diversion chamber 53. A passage 54 connects all of the chambers and carries a sliding spool 55. An inlet port 56 communicates with the inlet chamber 51 through passage 57. An outlet port 58 communicates with the outlet chamber 52 through a passage 59. A filter chamber 60 is provided on the base and is formed by a cap 61 which may be bolted to the base or threaded into the base if desired. A filter element 62 is provided within the filter chamber and is held by an axially extending bolt 63 threaded into the base 50. A filter inlet port 64 communicates with the filter chamber or other side of the filter element 62 and with the passageway 54. A second filter port 65 communicates with the interior of the filter element 62 and the diversion chamber 53. The spool 55 is provided with a hollow axial chamber 66 provided intermediate its ends with radial openings 67 communicating through the wall of the spool. A spring 68 normally urges the spool to the left viewing FIGURE 4 in which position all of the chambers are sealed from one another.

In operation, high pressure fluid is introduced into the base through the inlet 56 and passes through the passage 57 to the inlet chamber 51 where it bears against the end of the spool 55 urging the spool to the right overcoming the pressure of spring 68 which permits the fluid to pass into the filter inlet port 64, into the filter element 62, into the filter port 65, through the diversion chamber 53 from which it passes, through opening 67 into the interior of the spool and from there to the outlet chamber 52 through passage 59 to the outlet port 58. Alternatively, a portion of the fluid entering the spool 55 may pass through the openings 67 into relief chamber 69 and from the relief chamber through passage 70 to the outlet port 58. In the event that the pressure in the system becomes higher than a pre-selected set point, the spool acts as a relief valve and moves to the right opening chamber 51, to chamber 69, bypassing the fluid from chamber 51 through port 64 directly into chamber 69 and to outlet port 58.

While we have indicated that this filter has particular utility in high pressure hydraulic systems, it will be obvious that the filter has general utility and could be used in low pressure systems as well.

In the foregoing specification, we have illustrated and described certain preferred embodiments of our invention. It will be understood, however, that this invention may be otherwise embodied within the scope of the following claims.

We claim:

1. A high pressure filter comprising a base having spaced inlet and outlet chambers and an intermediate diversion chamber, an inlet port communicating with the inlet chamber, an outlet port communicating with the outlet chamber, a passage extending through said inlet, outlet and diversion chambers, a filter chamber on said base, filter means in said filter chamber, a first filter port means communicating from one side of the filter means to the inlet chamber, a second filter port means continuously communicating from the other side of the filter means to the diversion chamber, a sliding spool in the passage movable lengthwise thereof, means on the spool acting in one position of the spool to close all of the chambers in the base, in a second position to open the inlet chamber to the first filter port and the diversion chamber to the outlet chamber and in a third position opening all chambers through the passage to provide communication directly from the inlet to the outlet ports bypassing the filter chamber and resilient means continuously urging the spool means to the first position, said resilient means being adjusted to permit the spool to move successively from the first to the third position at pre-selected fluid input pressures.

2. A high pressure filter comprising a base having spaced inlet and outlet chambers and an intermediate diversion chamber, an inlet port communicating with the inlet chamber, an outlet port communicating with the outlet chamber, a passage extending through said inlet, outlet and diversion chambers, a filter chamber on said base, filter means in said filter chamber, a first filter port means intersecting the passage intermediate the inlet chamber and diversion chamber communicating from one side of the filter means to the inlet chamber, a second filter port means continuously communicating from the other side of the filter means to the diversion chamber, a sliding spool in the passage movable lengthwise thereof, means on the spool acting in one position of the spool to close all of the chambers in the base, in a second position to open the inlet chamber to the first filter port and the diversion chamber to the outlet chamber and in a third position opening all chambers through the passage to provide communication directly from the inlet to the outlet ports bypassing the filter chamber and resilient means continuously urging the spool means to the first position, said resilient means being adjusted to permit the spool to move successively from the first to the third position at pre-selected fluid input pressures.

3. A high pressure filter comprising a base having spaced inlet and outlet chambers and an intermediate diversion chamber, an inlet port communicating with the inlet chamber, an outlet port communicating with the outlet chamber, a bore extending through said inlet having lands between said chambers, outlet and diversion chambers, a filter chamber on said base, filter means in said filter chamber, a first filter port means intersecting the bore intermediate the inlet chamber and diversion chamber communicating from one side of the filter means to the inlet chamber, a second filter port means continuously communicating from the other side of the filter means to the diversion chamber, a sliding spool in the bore movable lengthwise thereof, lands on the spool coacting with the lands in the bore so that the spool normally acts to close all of the chambers in the base in a first position, in a second position said spool lands coact with the lands in the bore to open the inlet chamber to the first filter port and the diversion chamber to the outlet chamber and in a third position said spool lands and bore lands coact to open all chambers through the bore to provide communication directly from the inlet to the outlet ports bypassing the filter chamber and resilient means continuously urging the spool means to the first position, said resilient means being adjusted to permit the spool to move successively from the first to the third position at pre-selected fluid input pressures.

4. A filter as claimed in claim 3 wherein the resilient means is a spring bearing against the end of the spool means in the bore.

5. A high pressure filter comprising a base having spaced inlet and outlet chambers and an intermediate diversion chamber, an inlet port communicating with the inlet chamber, an outlet port communicating with the outlet chamber, a bore extending through said inlet, outlet and diversion chambers, a filter chamber on said base, filter means in said filter chamber, a first filter port means communicating from one side of the filter means to the inlet chamber, a second filter port means continuously communicating from the other side of the filter means to the diversion chamber, a sliding spool in the bore movable lengthwise thereof, said spool having a central axial passage open at one end to the outlet chamber, radial openings in the wall of said spool intermediate the ends thereof communicating between the exterior of the spool and the central passage, said spool normally acting in a first position of the spool to close all of the chambers in the base, in a second position to open the inlet chamber to the first filter port and the diversion chamber to the outlet chamber through the radial openings and central axial passage and in a third position opening the inlet chamber to the diversion chamber through the bore to provide communication directly from the inlet to the outlet ports bypassing the filter chamber and resilient means continuously urging the spool means to the first position, said resilient means being adjusted to permit the spool to move successively from the first to the third position at pre-selected fluid input pressures.

References Cited by the Examiner

UNITED STATES PATENTS

| | | | |
|---|---|---|---|
| 1,874,847 | 8/1932 | Arnold | 210—136 X |
| 2,070,039 | 2/1937 | Briggs | 210—136 |
| 2,602,547 | 7/1952 | Floss et al. | 210—133 |

REUBEN FRIEDMAN, *Primary Examiner.*

F. SPEAR, *Assistant Examiner.*